UNITED STATES PATENT OFFICE.

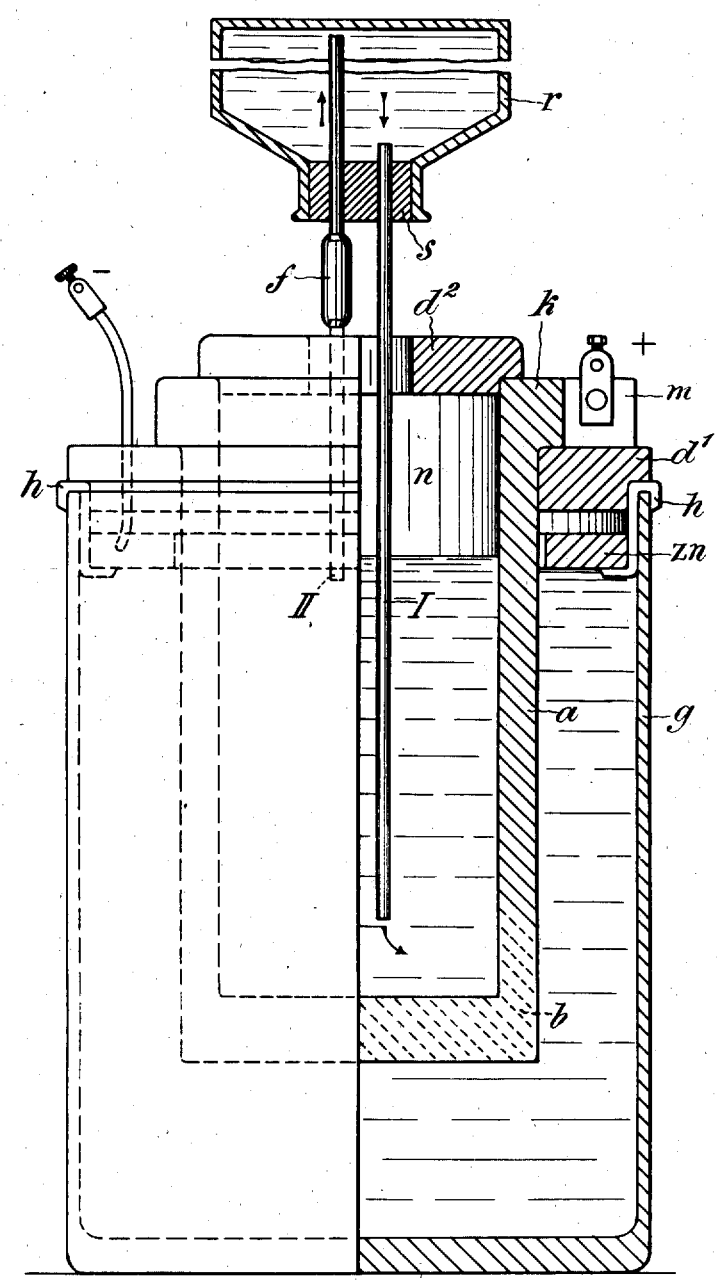

KARL HEINTZ, OF MUNICH, GERMANY.

PRIMARY BATTERY.

No. 901,445.    Specification of Letters Patent.    Patented Oct. 20, 1908.

Application filed December 26, 1907. Serial No. 408,128.

*To all whom it may concern:*

Be it known that I, KARL HEINTZ, physicist, subject of the King of Bavaria, residing at Munich, 2 Maximilianstrasse, Germany, have invented new and useful Improvements in and Relating to Primary Batteries, of which the following is a specification.

The invention concerns primarily the use of nitric acid in the permanently combined cell. Hitherto such cells, which were working with a clay-cell separating the exciting- from the depolarizing solution, had to be completely taken apart after use, or it was, at least, necessary to remove the zinc from the solution as otherwise the two solutions diffused into one another and the nitric acid had direct access to the zinc, which caused considerable losses. On the other hand, on account of its energetic action, its low price and the fact that it does not, like chromic acid, make the cell filthy with products of decomposition, nitric acid shows considerable advantages over the hitherto customary constant cells, such as manganese di-oxid, Daniell and copper oxid cells. It is, therefore, desirable to be able to use nitric acid in cells which may be operated just as conveniently, and to make it unnecessary to take the cells to pieces after use. Furthermore, it is the aim of the invention to decrease the amount of nitric acid used by making a better use of its oxygen. This is accomplished by using, instead of concentrated nitric acid, a solution of sulfuric acid of 30% or more mixed with nitric acid. This mixture is cheaper than nitric acid and depolarizes just as well. The cell is only then exhausted when the nitric acid is entirely used up, which may be seen from the fact that a sulfuric acid solution of the above concentration with about 2% nitric acid depolarizes readily and gives the cell a tension of from 1.75 to 1.8 volt. It then suffices to add concentrated nitric and sulfuric acid in order to make the cell again effective; it is not necessary in this connection to pour out the exhausted depolarizing solution which now almost wholly consists only of sulfuric acid. However, such solutions cannot be used in the usual clay-cells since, on account of the addition of sulfuric acid, they diffuse strongly and the sulfuric acid would, moreover, soon render the clay-cells brittle and useless. If such cells are intended for constant use, then it is impossible to use the customary 5% sulfuric acid as exciting solution, since sulfuric acid becomes at length harmful also to amalgamated zinc; there remains, therefore, only the use of neutral salt solutions, and it is of great importance to prevent any diffusion of free sulfuric acid through the diaphragm. As has been said, clay-cells cannot be used for this purpose. On the other hand, the use of carbon diaphragms in connection with chromic acid or nitric acid has up to this time not yielded any satisfactory results, since these acids even in moderate dilution no longer depolarize.

Since the cells assume a tension which corresponds to the potential of the carbon wall facing the exciting solution and since a considerable dilution of the depolarizer takes place at this wall, it is clear that a satisfactory depolarization cannot be obtained. If now, as in the above indicated manner, a mixture composed of nitric acid and sulfuric acid is used in a carbon diaphragm, there arises as a new phenomenon the diffusion which is increased by the water-drawing sulfuric acid, which causes a stronger penetration of the carbon diaphragm and which, besides, on account of the influence which it exerts upon the nitric acid, maintains the potential of the outer wall of the carbon, and, thereby, the electro-motive force of the cell. On the other hand, the thick carbon wall decreases the harmful excessive diffusion of sulfuric acid and the above mentioned purpose is thereby fulfilled, *i. e.*, a cell has been created which combines the advantage of high tension and of cheap operation with the advantage of a minimum of work on the part of the operator, in so far as such a cell, even in the position of rest, uses up only an insignificant amount of zinc, and consequently, may remain combined even after use.

A cell according to my invention is illustrated in the accompanying drawings which show such a cell in sectional elevation.

In these drawings the container for the exciting solution is shown at *g*, which carries at its upper end an annular cover *d'*. Upon this is supported the carbon *k*, which is in the shape of a hollow cylinder provided with a terminal *m*. Carried by suitable supports shown at *h* is a ring *z n* of zinc, the support being adapted to hold the zinc at the top of the exciting solution. *a* designates the impermeable part of the carbon and *b* the lower permeable part which serves as a diaphragm.

In order to conveniently effect the strengthening of the exciting depolarizing mixture, which is contained within the space n within the carbon, I provide a glass r having a cork s and two glass tubes I, II, the former of which extends only slightly within the walls at one end while the latter extends through the cork to the bottom of the vessel r. These tubes I, II are of unequal length and the shorter one is provided with a rubber portion f which may be pinched by the fingers to serve as a valve and when so pinched the vessel r may be inverted to bring the tubes I, II into the position shown in the drawings, whereupon the release of the pinched portion f will cause heavy regenerative fluid to flow down through the tube 1, the latter exhaustive fluid passing upward through the tube 2.

Having thus described my invention what I claim is:—

1. A galvanic cell of the Bunsen type, containing a mixture consisting of a sulfuric acid solution of about 30% or more and nitric acid, said mixture being separated from the exciting solution by means of a carbon diaphragm.

2. A galvanic cell of the Bunsen type, containing a mixture consisting of a sulfuric acid solution of about 30% and nitric acid, an auxiliary concentrating solution consisting of concentrated sulfuric- and nitric acid, and a separating carbon diaphragm between said mixture and the exciting solution.

In testimony whereof I have signed my name to this specification in the presence of two subscribing witnesses.

KARL HEINTZ.

Witnesses:
WOLDEMAR HAUPT,
HENRY HASPER